United States Patent
Ito

(10) Patent No.: US 9,223,559 B2
(45) Date of Patent: Dec. 29, 2015

(54) INFORMATION PROCESSING APPARATUS, ELECTRONIC CONTROL UNIT, INFORMATION PROCESSING METHOD, AND PROGRAM

(75) Inventor: Masuo Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/364,553

(22) PCT Filed: Mar. 2, 2012

(86) PCT No.: PCT/JP2012/055479
§ 371 (c)(1),
(2), (4) Date: Jun. 11, 2014

(87) PCT Pub. No.: WO2013/128648
PCT Pub. Date: Sep. 6, 2013

(65) Prior Publication Data
US 2014/0337829 A1    Nov. 13, 2014

(51) Int. Cl.
G06F 9/445    (2006.01)
G06F 9/45    (2006.01)
H04L 12/40    (2006.01)
H04L 12/24    (2006.01)

(52) U.S. Cl.
CPC .. *G06F 8/61* (2013.01); *G06F 8/41* (2013.01); *H04L 12/40169* (2013.01); *H04L 41/0806* (2013.01); *H04L 41/0846* (2013.01); *H04L 41/0886* (2013.01); *H04L 2012/40273* (2013.01)

(58) Field of Classification Search
CPC ................ G06F 8/30; G06F 8/41; G06F 8/61
USPC ......................................... 717/106, 140, 175
See application file for complete search history.

(56) References Cited

U.S. PATENT DOCUMENTS 6,106,298 A * 8/2000 Pollak ................... G09B 9/003
434/29
6,546,321 B1 * 4/2003 Ohkubo ....................... 701/33.4

(Continued)

FOREIGN PATENT DOCUMENTS

JP    2002-051058 A    2/2002
JP    2003-533942 A    11/2003

(Continued)

OTHER PUBLICATIONS

International Search Report issued Mar. 27, 2012 in PCT/JP2012/055479 filed Mar. 2, 2012.

(Continued)

*Primary Examiner* — Phillip H Nguyen
(74) *Attorney, Agent, or Firm* — Oblon, McClelland, Maier & Neustadt, L.L.P.

(57) ABSTRACT

A configuration information generation section 11 uses configuration information of an ECU 2 and configuration information of a new device 5 which is to be newly connected to the ECU 2, generates and outputs to the ECU 2, new configuration information after the new device 5 is connected to the ECU 2. An executable file generation section 12 links an object file of a control program implemented on the ECU 2, and an object file of a control program to control the new device 5, and generates and outputs to the ECU 2 an executable file of a new control program after the new device 5 is connected to the ECU 2.

12 Claims, 13 Drawing Sheets

(56) References Cited

U.S. PATENT DOCUMENTS

| | | | |
|---|---|---|---|
| 7,050,897 B2 * | 5/2006 | Breed et al. ............ 701/46 |
| 2002/0007238 A1 | 1/2002 | Moriguchi et al. |
| 2004/0015272 A1 | 1/2004 | Vollmer et al. |
| 2005/0200889 A1 | 9/2005 | Oomura |
| 2007/0263621 A1 | 11/2007 | Oshima et al. |
| 2013/0067465 A1 * | 3/2013 | Fuhrman et al. ............ 718/1 |
| 2014/0334300 A1 * | 11/2014 | Horihata ............ H04L 12/40039 370/230 |

FOREIGN PATENT DOCUMENTS

| | | |
|---|---|---|
| JP | 2004-179772 A | 6/2004 |
| JP | 2005-047302 A | 2/2005 |
| JP | 2005-236560 A | 9/2005 |
| JP | 2005-258661 A | 9/2005 |
| JP | 2006-190167 | 7/2006 |
| JP | 2006-295426 A | 10/2006 |
| JP | 2007-156958 A | 6/2007 |
| JP | 2007206827 A * | 8/2007 ............ G06F 9/445 |
| JP | 2009-200617 A | 9/2009 |
| JP | 2010-112351 | 5/2010 |
| JP | 2011-108161 | 6/2011 |
| JP | 2011-188591 | 9/2011 |

OTHER PUBLICATIONS

Japanese Office Action issued Jun. 2, 2015 for Japanese Patent Application No. 2014-501943 with partial English translation.

* cited by examiner

Fig. 8

```
I/O PORT : 5
FIRST PORT (INPUT-OUTPUT)
REGISTER :0x0010
SECOND PORT (INPUT-OUTPUT)
REGISTER : 0x0012
. . .
INTERRUPT : 4
. . .
```

Fig. 9

| I/O PORT | | | | INTERRUPT VECTOR | | | |
|---|---|---|---|---|---|---|---|
| NUMBER | ADDRESS | SETTING VALUE | STATUS OF USE | NUMBER | ADDRESS | SETTING VALUE | STATUS OF USE |
| 1. | 0x0010 | 0x0000 | (UNUSED) | 1. | 0x4000 | _iOS_aaa | OS ID |
| 2. | 0x0012 | 0x0000 | (UNUSED) | 2. | 0x4002 | _start | (UNUSED) |
| 3. | 0x0014 | 0x0000 | (UNUSED) | 3. | 0x4004 | _start | (UNUSED) |
| 4. | 0x0016 | 0x0000 | (UNUSED) | 4. | 0x4006 | _start | (UNUSED) |
| 5. | 0x0018 | 0x0000 | (UNUSED) | | | | |

Fig. 10

```
REQUIRED RESOURCES
· 1 100msec TIMER (INTEGER NAME: iDV_timer)
· 1 I/O PORT INPUT
```

Fig. 11

```
DEVICE ATTACHMENT PORT
SECOND PORT
```

Fig. 12

| I/O PORT | | | INTERRUPT VECTOR | | |
|---|---|---|---|---|---|
| NUMBER ADDRESS | SETTING VALUE | STATUS OF USE | NUMBER ADDRESS | SETTING VALUE | STATUS OF USE |
| 1. 0x0010 | 0x0000 | (UNUSED) | 1. 0x4000 | iOS_aaa | OS ID |
| 2. 0x0012 | 0x0101 | ID OF NEW DEVICE | 2. 0x4002 | iDv_timer | ID OF NEW DEVICE |
| 3. 0x0014 | 0x0000 | (UNUSED) | 3. 0x4004 | _start | (UNUSED) |
| 4. 0x0016 | 0x0000 | (UNUSED) ADD | 4. 0x4006 | _start | (UNUSED) ADD |
| 5. 0x0018 | 0x0000 | (UNUSED) | | | |

INFORMATION PROCESSING APPARATUS, ELECTRONIC CONTROL UNIT, INFORMATION PROCESSING METHOD, AND PROGRAM

TECHNICAL FIELD

The present invention relates to technology that controls equipment to be installed on a vehicle.

BACKGROUND ART

For example, in Patent Literature 1, a gateway apparatus that enables a general-purpose mobile terminal to be used after connecting it to an in-vehicle network is disclosed.

More specifically, Patent Literature 1 discloses technology of the gateway apparatus converting command information between the mobile terminal and on-vehicle devices on in-vehicle networks each corresponding to a different communication protocol, and sending and receiving the command information between the mobile terminal and the on-vehicle device.

Patent Literature 2 discloses a method to add equipment to a communication network of a vehicle.

More specifically, Patent Literature 2 discloses a method of directly calling a dedicated driver to newly added equipment from the communication network (for example, from an internet page of a maker of the driver via the Internet), and providing the equipment with the dedicated driver.

Furthermore, Patent Literature 3 discloses a method of adding equipment to a communication network of a vehicle.

More specifically, Patent Literature 3 discloses a method of reconfiguring network by changing an ID (Identifier) of equipment to be connected, to an ID being associated with an operation order from the ID allocated in advance.

Patent Literature 4 discloses a communication system that calls setting information from an external storage means when equipment is connected to a network.

The setting information of Patent Literature 4 are setting information at an application level, such as volume and track order on audio equipment, a registered location on a car navigation, and a temperature setting of air conditioning equipment.

Patent Literature 5 discloses technology that a device sends device information to an information processing apparatus that is to be a host, and the information processing apparatus, based on the device information received from the device, installs a driver with DLL (Dynamic Link Library) files.

CITATION LIST

Patent Literature

Patent Literature 1: JP2005-236560 A
Patent Literature 2: JP2003-533942 A
Patent Literature 3: JP2006-295426 A
Patent Literature 4: JP2002-051058 A
Patent Literature 5: JP2005-258661 A

SUMMARY OF INVENTION

Technical Problem

The related art (Patent Literature 1) is of a technology of the gateway apparatus converting the command information for the equipment connected to the network.

Therefore, there is a problem that, even if using the technology of Patent Literature 1, controller software of a device to be newly added to an ECU (Electronic Control Unit) cannot be provided to the ECU.

The related art (Patent Literature 2) is of a technology to load the driver of the equipment to be added to the communication network of the vehicle, and as the technology is for IEEE1394, there is a problem that high specification hardware resources are required, which is similar to a problem of Patent Literature 5 that will be later described.

The related art (Patent Literature 3) is of a technology that allocates to a newly added device, a new ID by an ID changing means based on a related operation list owned by a different unit to be added to a network.

Therefore, similar to the problem of Patent Literature 1, there is a problem that, even if using the technology of Patent Literature 3, the controller software of the device to be newly added to the ECU cannot be provided to the ECU.

Since the related art (Patent Literature 4) is of a technology to call the setting information at the application level from the external storage means, there is a problem that the controller software of the device to be newly added to the ECU cannot be provided to the ECU, even if using the technology of Patent Literature 4, which is similar to the problem of Patent Literature 1.

Since the DLL file that the information processing apparatus of the related art (Patent Literature 5) handles uses a dynamic link, there is a problem that high specification hardware resources are required and therefore, the information processing apparatus cannot be applied to an on-vehicle apparatus from a cost point of view.

Since in the related art (Patent Literature 1 through 5), the equipment information is sent from the equipment to be added, a communication function to send data is required in the equipment. Therefore, there is a problem of a rise in the cost of the equipment.

The present invention is conceived in light of such problems described above. The present invention mainly aims to enable an electronic control unit to control a device without a communication function when the device is connected to the electronic control unit, and to enable the electronic control unit to execute a control program without using a dynamic link.

Solution to Problem

An information processing apparatus according to the present invention includes:

a configuration information generation section that generates, using configuration information of an electronic control unit installed on a vehicle, and configuration information of a newly connected device which is to be newly connected to the electronic control unit, new configuration information of the electronic control unit after the newly connected device is connected;

an executable file generation section that generates, by linking an object file of a control program implemented on the electronic control unit, and an object file of a control program to control the newly connected device, an executable file of a new control program the electronic control unit executes after the newly connected device is connected; and an output section that outputs to the electronic control unit, the new configuration information generated by the configuration information generation section, and the executable file of the new control program generated by the executable file generation section.

Advantageous Effects of Invention

According to the present invention, as the information processing apparatus generates and outputs to the electronic control unit, the new configuration information after the newly connected device is connected, the newly connected device is not required to communicate with the electronic control unit, and even when the device without the communication function is connected to the electronic control unit, the electronic control unit is able to control the device.

According to the present invention, as the information processing apparatus generates and outputs to the electronic control unit the executable file of the new control program after the newly connected device is connected, the electronic control unit is able to execute the control program without using the dynamic link.

BRIEF DESCRIPTION OF DRAWINGS

FIG. 8 a diagram showing an example of a specification of an ECU according to the first embodiment;

FIG. 9 a diagram showing an example of configuration information implemented on the ECU according to the first embodiment;

FIG. 10 a diagram showing an example of configuration information of a new device according to the first embodiment;

FIG. 11 a diagram showing an example of device attachment port information according to the first embodiment;

FIG. 12 a diagram showing an example of updated configuration information according to the first embodiment;

DESCRIPTION OF EMBODIMENTS

Embodiment 1

Figure 1:
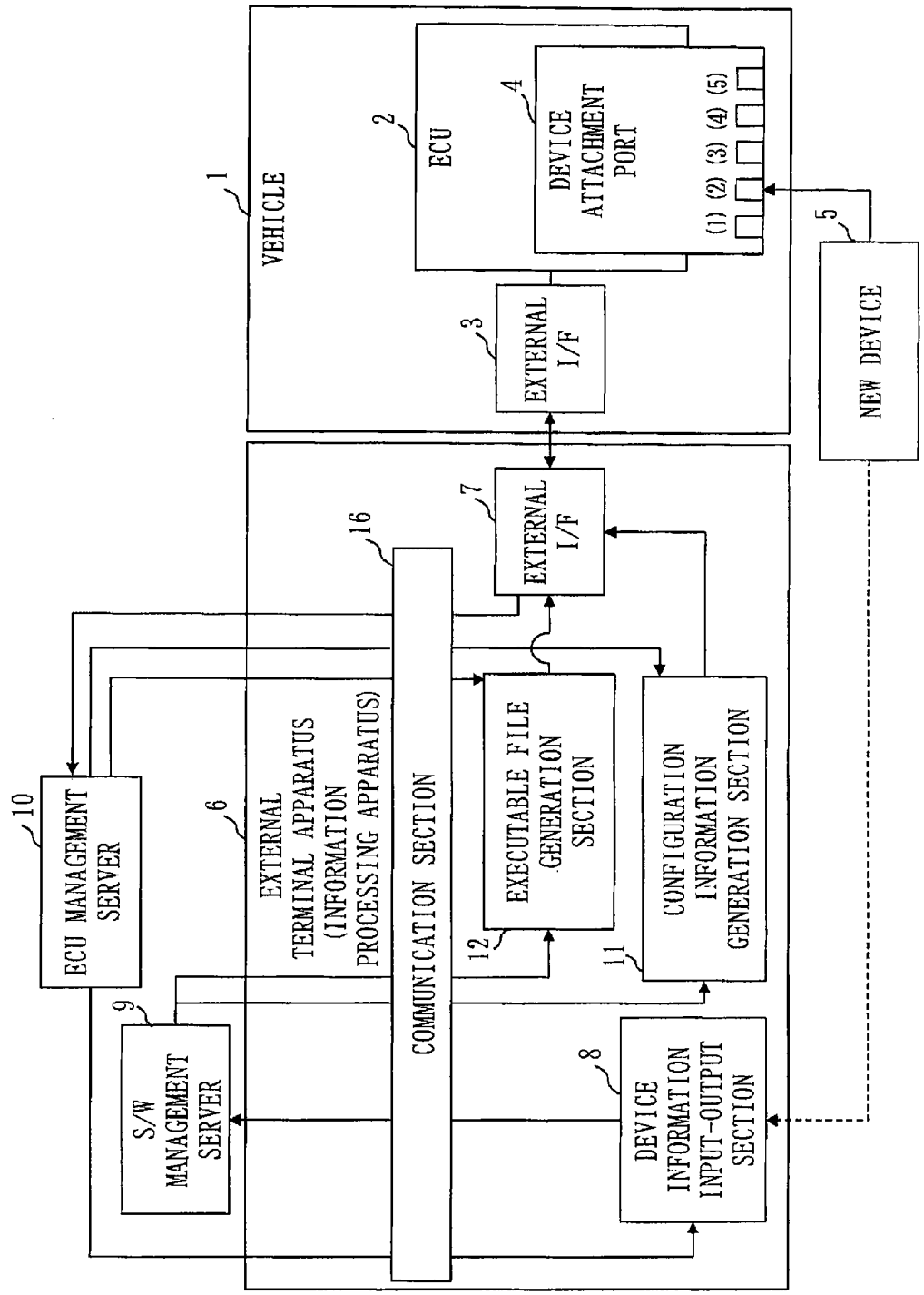
FIG. 1 a diagram showing an example of structures of an on-vehicle apparatus and an external terminal apparatus according to a first embodiment.

FIG. 1 is a diagram showing an example of structures of an on-vehicle apparatus and an external terminal apparatus according to the present embodiment.

The on-vehicle apparatus is structured of an ECU 2 installed on a vehicle 1, an external I/F (interface) 3, and a device attachment port 4 to be installed on the vehicle.

The external terminal apparatus 6 is structured of the external I/F 7 which is able to communicate with the vehicle, a device information input-output section 8, a configuration information generation section 11, an executable file generation section 12, and a communication section 16.

The communication section 16 is capable of wireless communication, and the external terminal apparatus 6 is capable of receiving various information from a S/W (software) management server 9 and from an ECU management server 10 by the wireless communication by the communication section 16.

The external I/F 3 installed on the vehicle 1 is such standard external I/F as an OBDII or an external I/F that the ECU 2 has.

On the ECU 2, controller software of the device to be connected to the ECU 2 is implemented.

The controller software is implemented on a rewritable flash memory to be installed on the ECU 2.

The device attachment port 4 is integrated with the ECU 2, and each terminal of the device attachment port 4 is physically connected to a microcomputer or a terminal of another IC implemented on the ECU 2.

The ECU management server 10 manages a H/W (hardware) specification of the ECU 2 and a software implementation status of the ECU 2 for each ID that the ECU 2 installed on the vehicle 1 has.

Content that the ECU management server 10 manages is an object file, configuration information, and information of the device attachment port 4, each is implemented on the ECU 2.

The information of the device attachment port 4 is type, number, and status of the ports.

The H/W (hardware) specification that the ECU management server 10 manages is information required in implementing software, such as register information, a memory map, etc.

The ECU management server 10, at the time of updating the software of the ECU 2, also updates the management content.

Further, the ECU management server 10 corresponds to an example of a first management apparatus.

The S/W management server 9 manages an object file that controls a new device 5 and configuration information for the new device 5.

In FIG. 1, the S/W management server 9 is placed outside of the external terminal apparatus 6, but may also be placed inside the external terminal apparatus 6.

Further, the S/W management server 9 corresponds to an example of a second management apparatus.

The external I/F 7 of the external terminal apparatus 6 is connected to the external I/F 3 of the vehicle 1, and similar to the external I/F 3 of the vehicle 1, corresponds to such standard external I/F as the OBDII or an external I/F that the ECU 2 has.

The external I/F 7 outputs to the ECU 2, new configuration information that the configuration information generation section 11 generated, and an executable file of a new control program generated by the executable file generation section 12.

The external I/F 7 corresponds to an example of an output section.

The device information input-output section 8 includes a display section such as a touch panel, etc., and outputs to the display section the information of the device attachment port 4 of the vehicle 1.

Output methods include, for example, displaying and all ports that the device attachment port 4 has, and differentiating an in-use port in a dark color from an unused port in a bright color.

The device information input-output section 8 includes a function to input a port number of the device attachment port 4 that the new device 5 is to be attached to.

Input methods include, for example, touching by an operator on the unused port displayed in the bright color on the above touch panel.

Further, the device information input-output section 8 includes an input function that inputs a device ID of the new device 5.

Inputting of the device ID is done, for example, by the operator inputting manually using a keyboard, etc.

Or, a bar code may be pasted onto a new device, and read by a reader.

The configuration information generation section 11, from configuration information before the new device 5 is attached to the ECU 2, the configuration information of the new device 5, and a specification of the ECU 2, determines whether or not the new device 5 is attachable, and if attachable, generates new configuration information that the new device 5 to be implemented on the ECU 2 is able to use.

The executable file generation section 12 includes a linker function, and from an implementation content of an object file before the new device 5 is attached to the ECU 2, an object file of the new device 5, and the specification of the ECU 2, determines whether or not the new device 5 is attachable, and if attachable, generates a new executable file (the executable file of the control program) that the new device 5 to be implemented on the ECU 2 is able to use.

Next, a flow of operation will be explained.

Figure 2:
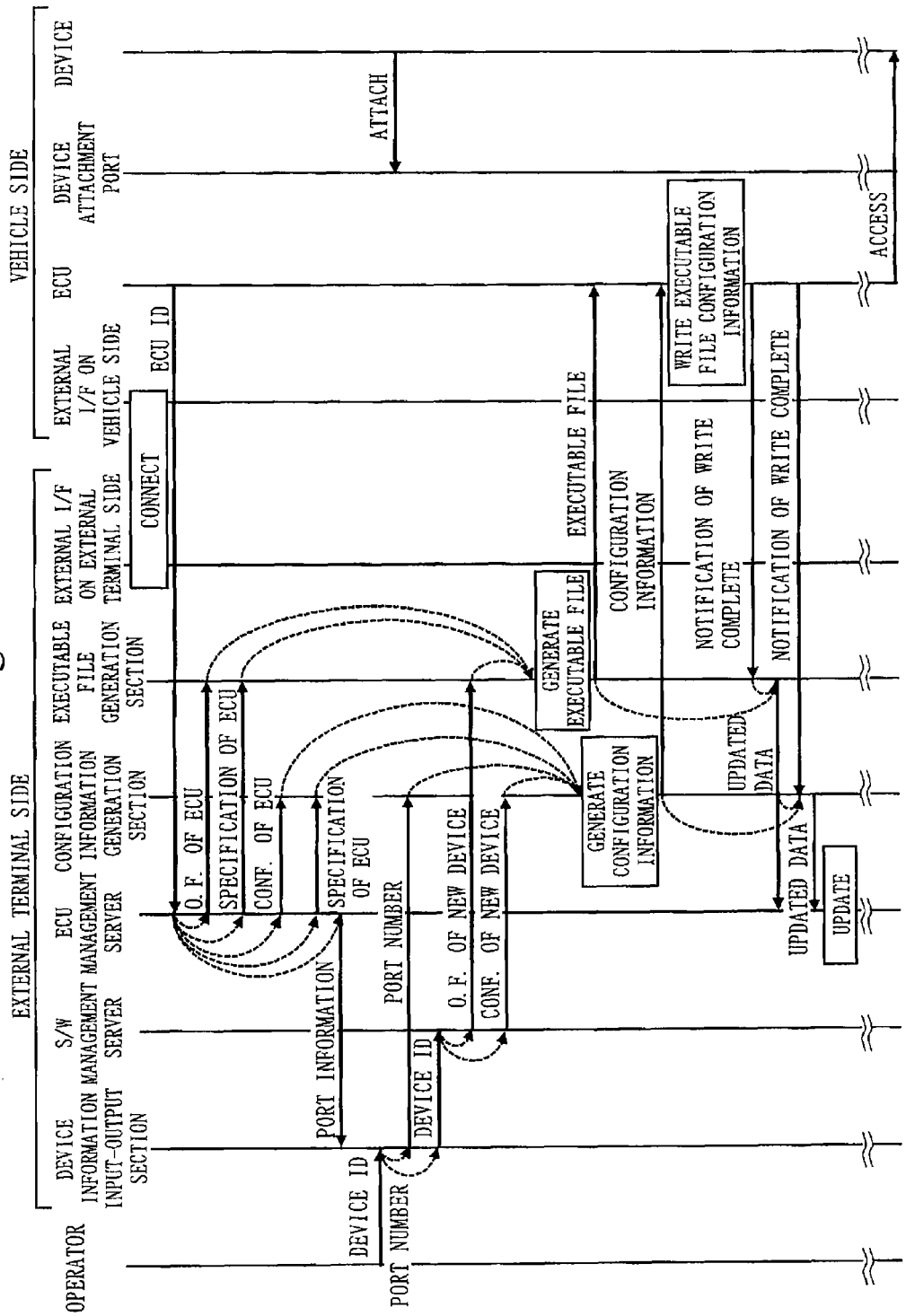
FIG. 2 a diagram showing an entire operation sequence according to the first embodiment.

FIG. 2 shows an entire operation according to the present embodiment.

Details of the entire operation in FIG. 2 will be explained using FIG. 3 through FIG. 15.

Note that in FIG. 2, for figure drawing reasons, "object file" is shown as "O.F." and in some parts, "configuration information" is shown as "CONF.".

And in FIG. 2, although a description of the communication section 16 is omitted, communication among the S/W management server 9 and the ECU management server 10, the configuration information generation section 11, the executable file generation section 12, etc. are performed via the communication section 16.

FIG. 2 describes, for example, an operation from when the external terminal apparatus 6 and the ECU 2 are able to communicate with each other, after the operator brings in the external terminal apparatus 6 into the vehicle 1, the vehicle 1 and the external terminal apparatus 6 becomes connected by the connection of the external I/F 7 and the external I/F 3, and an initial connection including mutual authentication of the external terminal apparatus 6 and the ECU 2 are completed, although the mutual authentication is not described in FIG. 2.

Figure 13:
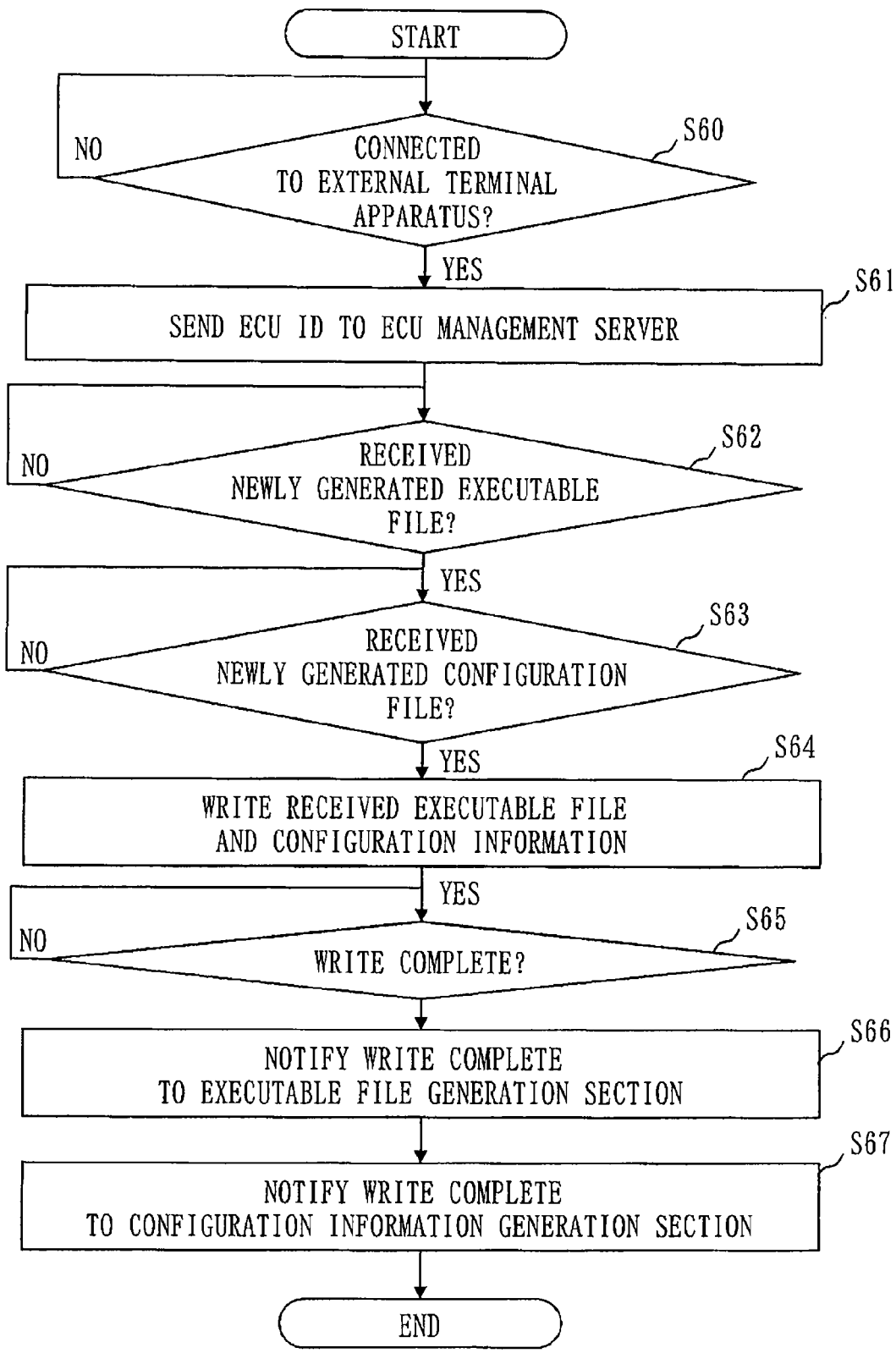
FIG. 13 a flowchart showing a process of the ECU at a time when the external terminal apparatus is connected according to the first embodiment.

When both become ready to communicate, the ECU 2 sends an ECU ID that the ECU 2 owns to the ECU management server 10 on an external terminal apparatus side (S60, S61 of FIG. 13).

More specifically, for example, the external I/F 3 of the ECU 2 outputs the ECU ID of the ECU 2 to the external I/F 7 of the external terminal apparatus 6, and then the external I/F 7 sends the ECU ID to the ECU management server 10 via the communication section 16.

Alternatively, the ECU 2 may, with another procedure, send the ECU ID to the ECU management server 10.

Figure 3:
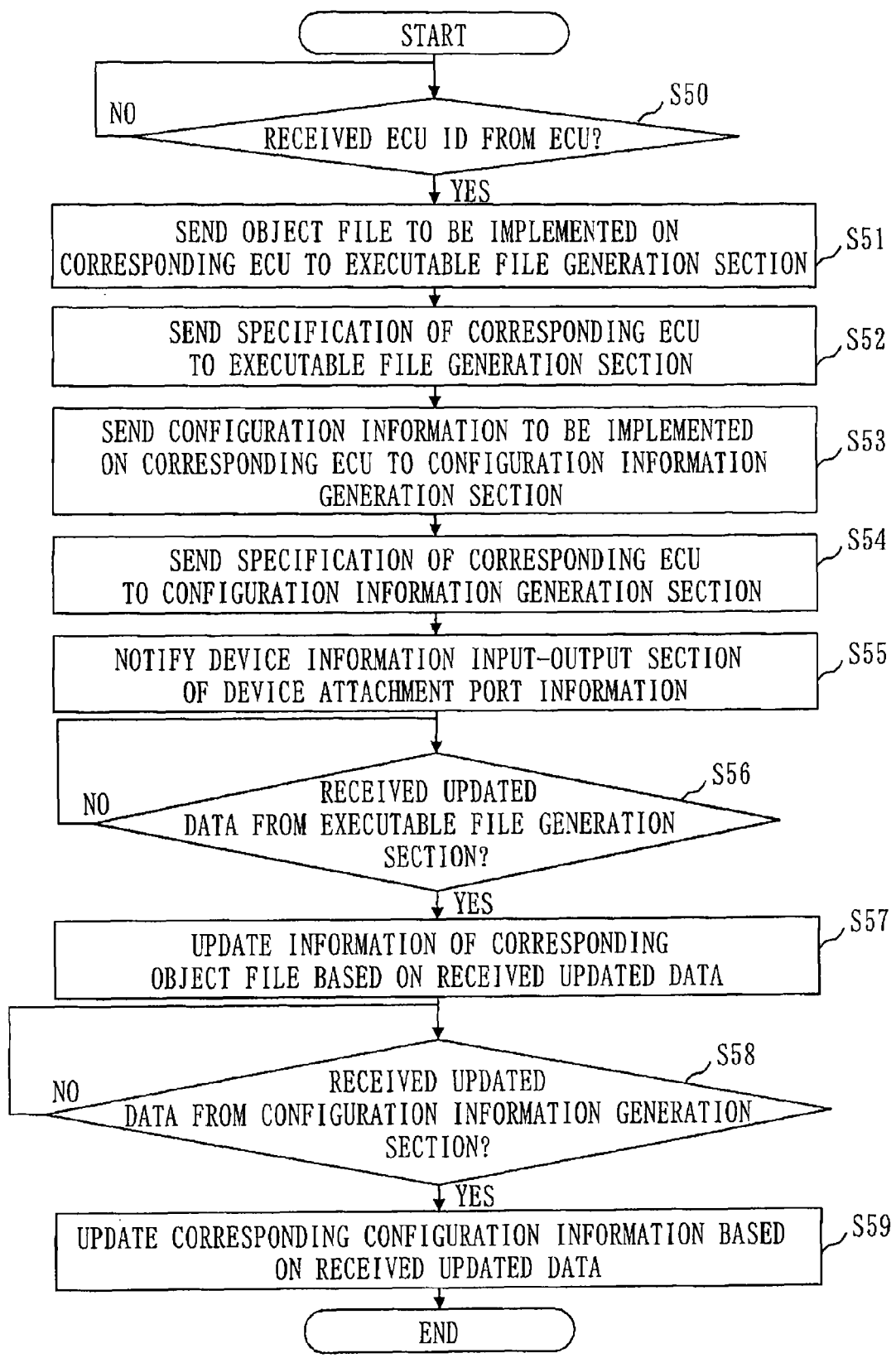
FIG. 3 a flowchart showing an operation of an ECU management server according to the first embodiment.

An operation of the ECU management server 10 will be explained using FIG. 3.

The ECU management server 10, upon receiving the ECU ID from the ECU 2 (S50), sends to the executable file generation section 12 an object file of the control program to be implemented on the ECU 2 corresponding to the ECU ID (S51).

Next, the ECU management server 10 sends to the executable file generation section 12 the specification of the ECU 2 of the corresponding ECU ID (S52).

Next, the ECU management server 10 sends to the configuration information generation section 11 the configuration information to be implemented on the ECU 2 corresponding to the ECU ID (S53).

Next, the ECU management server 10 sends to the configuration information generation section 11 a specification of an ECU corresponding to the ECU ID (S54).

Next, the ECU management server 10 notifies the device attachment port information to the device information input-output section 8 (S55).

Figure 4:
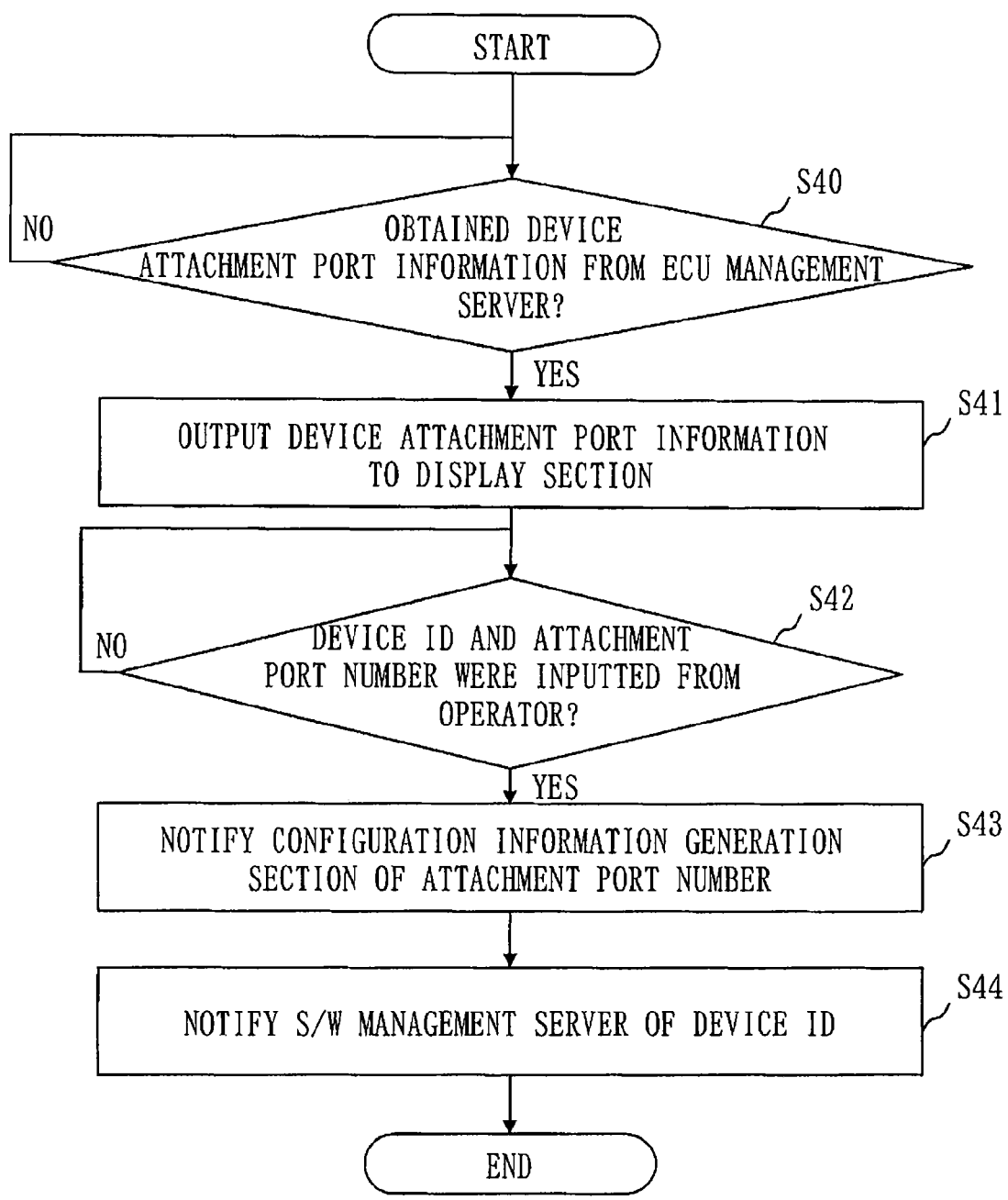
FIG. 4 a flowchart showing an operation of a device information input-output section according to the first embodiment.

Next, an operational flow of the device information input-output section 8 will be explained using FIG. 4.

The device information input-output section 8 outputs the device attachment port information to the display section (S41), upon obtaining the device attachment port information from the ECU management server 10 via the communication section 16 (S40).

Next, if there is input of the device ID and an attachment port number of the new device 5 from the operator (S42), the device information input-output section 8 notifies the inputted attachment port number to the configuration information generation section 11 (S43), and further, notifies the inputted device ID to the S/W management server 9 (S44).

The S/W management server 9 reads out from a storage area in the S/W management server 9, an object file and configuration information corresponding to the device ID obtained by a notification of the device ID (S44) from the device information input-output section 8.

The object file and the configuration information read out here are the object file and the configuration information to control the new device 5.

The S/W management server 9 sends the read out object file to the executable file generation section 12, and sends the read out configuration information to the configuration information generation section 11.

Next, an operational flow of the configuration information generation section 11 will be explained using FIG. 5.

First, the configuration information generation section 11 reads the specification of the ECU 2 sent from the ECU management server 10 at S54 (S10).

The configuration information generation section 11 reads the configuration information implemented on the ECU 2 and sent from the ECU management server 10 at S53 (S11).

The configuration information generation section 11 reads the configuration information of the new device 5 sent from the S/W management server 9 (S12).

Furthermore, the configuration information generation section 11 reads the attachment port number of the new device 5 sent from the device information input-output section 8 (S13).

Here, as an example, the specification of the ECU 2 read at S10 is shown in FIG. 8.

Configuration information implemented on the ECU2 read at S11 is shown in FIG. 9.

The configuration information of the new device 5 read at S12 is shown in FIG. 10.

Furthermore, the attachment port number of the new device 5 read at S13 is shown in FIG. 11.

Further, FIG. 8 shows that the present ECU 2 has five I/O ports (the first port and the second port represent input-output ports) and four interrupt resources.

FIG. 8 shows, for easier explanation, only I/O ports and interrupt vectors, but actually other information are included, such as the register information, the memory map, etc. that are required in implementing software.

FIG. 9 shows, a state where none of the five I/O ports of the ECU 2 are in use and one interrupt vector being used.

FIG. 10 shows that the new device 5 requires one timer resource and one I/O port input resource.

FIG. 11 shows that the second port of the device attachment port is to be used by the new device 5.

Next, the configuration information generation section 11 performs a configuration generation determination process (S14) based on the information read at S10 through S13.

Figure 6:
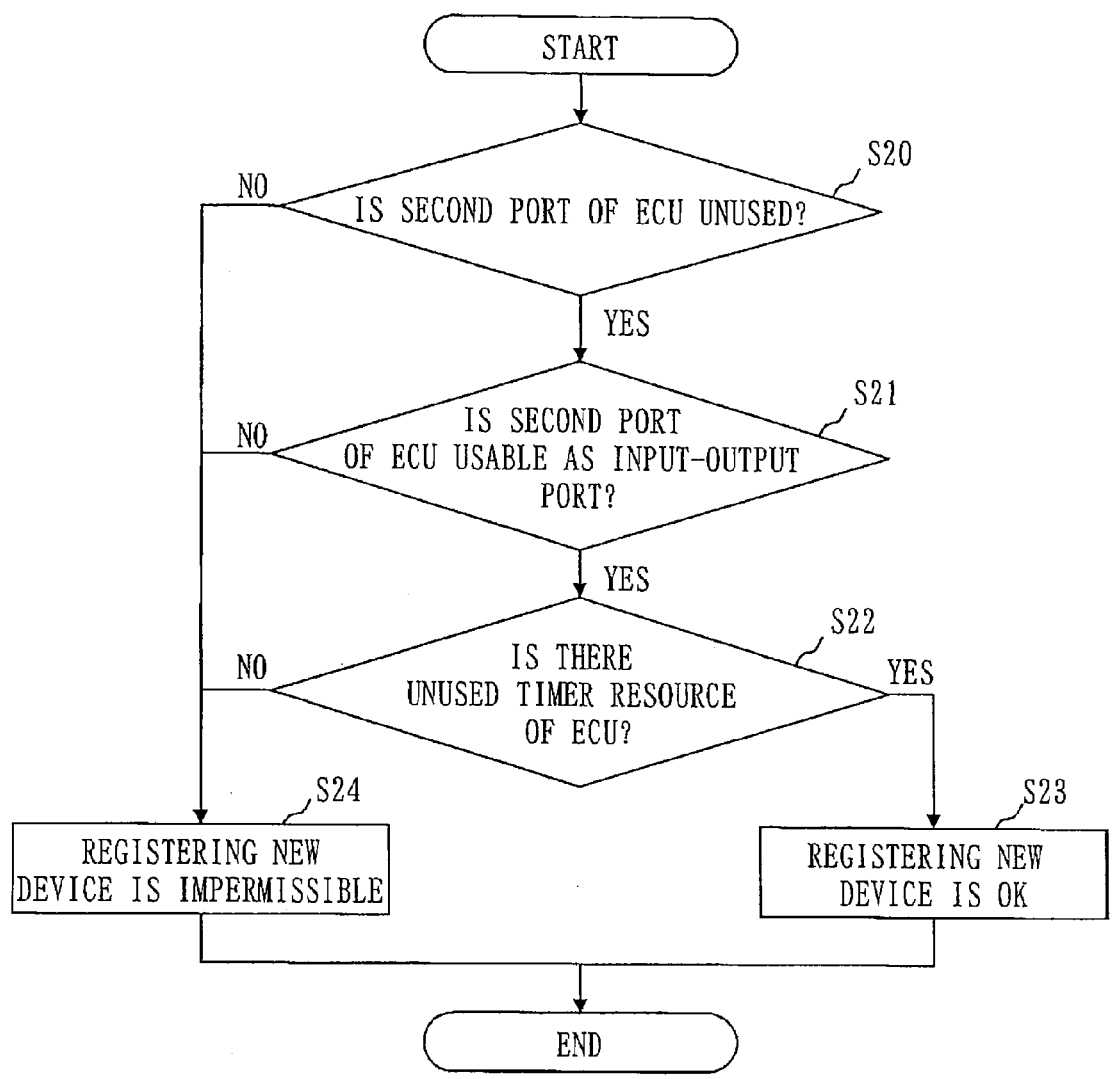
FIG. 6 a flowchart showing a configuration generation determination process according to the first embodiment.

Details of the configuration generation determination process (S14) will be explained using FIG. 6.

The attachment port number of the new device 5 read at S13 is, according to FIG. 11, the second port.

Since the attachment port number of the new device 5 is 2, the configuration information generation section 11 confirms status of use of the port number 2 of the configuration information implemented on the ECU 2 (FIG. 9) read at S11 (S20).

Since the status of use of the port number 2 of the configuration information implemented on the ECU 2 (FIG. 9) read at S11 is "unused", the configuration information generation section 11 next checks whether or not the second port is usable as an input port (S21).

Since FIG. 8 shows that the second port is the input-output port, it can be determined that the input port that the new device 5 requires is usable.

Next, the configuration information generation section 11 checks whether or not there is an unused resource in the timer resources of the ECU 2 (S22).

Since in FIG. 9, there are three unused interrupt resources, it can be determined that one interrupt is usable for the new device 5.

Accordingly, since the input port and the interrupt that the new device 5 requires become usable, the configuration information generation section 11 determines that new device registration is OK (S23).

Now return again to FIG. 5.

The configuration information generation section 11, when the registration of the new device is OK (S15), generates the new configuration information (S16).

The new configuration information generated here is shown in FIG. 12.

In newly generated configuration information, the device ID of the new device 5 is registered in the status of use of the I/O port 2, and a value to be used as an input is registered in the setting value (here, the value to be used as the input is shown as "0x0101").

The device ID of the new device 5 is registered in the status of use of a second interrupt vector, and an integer name described in FIG. 10 is registered in the setting value.

The configuration information generation section 11 sends to the ECU 2, the newly generated configuration information (S17).

Next, an operational flow of the executable file generation section 12 will be explained using FIG. 7.

The executable file generation section 12, first reads the specification of the ECU 2 (S30), and continues to read the object file implemented on the ECU 2 and sent from the ECU management server 10 (S31).

Furthermore, the executable file generation section 12 reads the object file for the new device 5 sent from the S/W management server 9 (S32).

Here, the executable file generation section 12, based on the specification obtained at S30, determines whether or not linking is executable on the object file read at S31 and the object file read at S32 (S33).

Specific item of the present determination process is, for example, checking whether or not physical address mapping is possible from the memory map that the ECU 2 has as its specification, if an execution of linking is performed on the object files of S31 and S32.

If the file after the execution of linking (the executable file) overflows from a flash memory area of the ECU 2 allotted as a ROM area, the execution of linking becomes impermissible, and if the file is capable of being accommodated in the flash memory area allotted as the ROM area, the execution of linking becomes OK.

If the execution of linking is possible (S34), the executable file generation section 12 executes linking on the object files of S31 and S32, and generates an executable file (S35).

And then, the executable file generation section 12 sends to the ECU 2 the generated new executable file via the external I/F 7 (S36).

Next, an operational flow of the ECU 2 will be explained using FIG. 13.

After the ECU 2 is connected to the external terminal apparatus 6 (S60), the ECU 2 sends the ECU ID to the ECU management server 10 (S61), as previously described.

After sending the ECU ID, the ECU 2 waits to receive the newly generated executable file and the newly generated configuration information (S62, S63).

The ECU 2, upon receiving the newly generated executable file and the newly generated configuration information, writes each of the newly generated executable file and the newly generated configuration information into a flash memory, etc. of the ECU 2 (S64).

Figure 15:
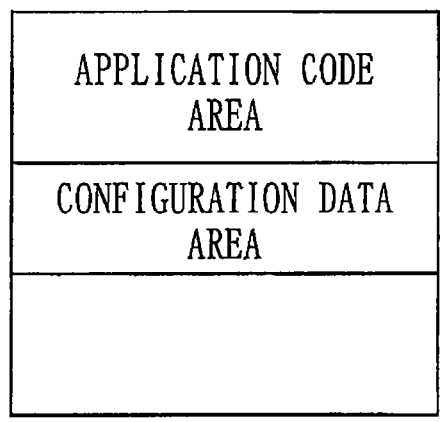
FIG. 15 a diagram showing a ROM area of the ECU according to the first embodiment.

Further, when writing, the ECU 2 writes into a predetermined area shown in FIG. 15.

In other words, the ECU 2 writes the newly generated executable file into an application code area and the newly generated configuration information into a configuration data area.

The ECU 2, after completing writing in of the newly generated executable file and the newly generated configuration information (S65), notifies the write complete to the executable file generation section 12 (S66) and notifies the write complete to the configuration information generation section 11 (S67).

Figure 5:
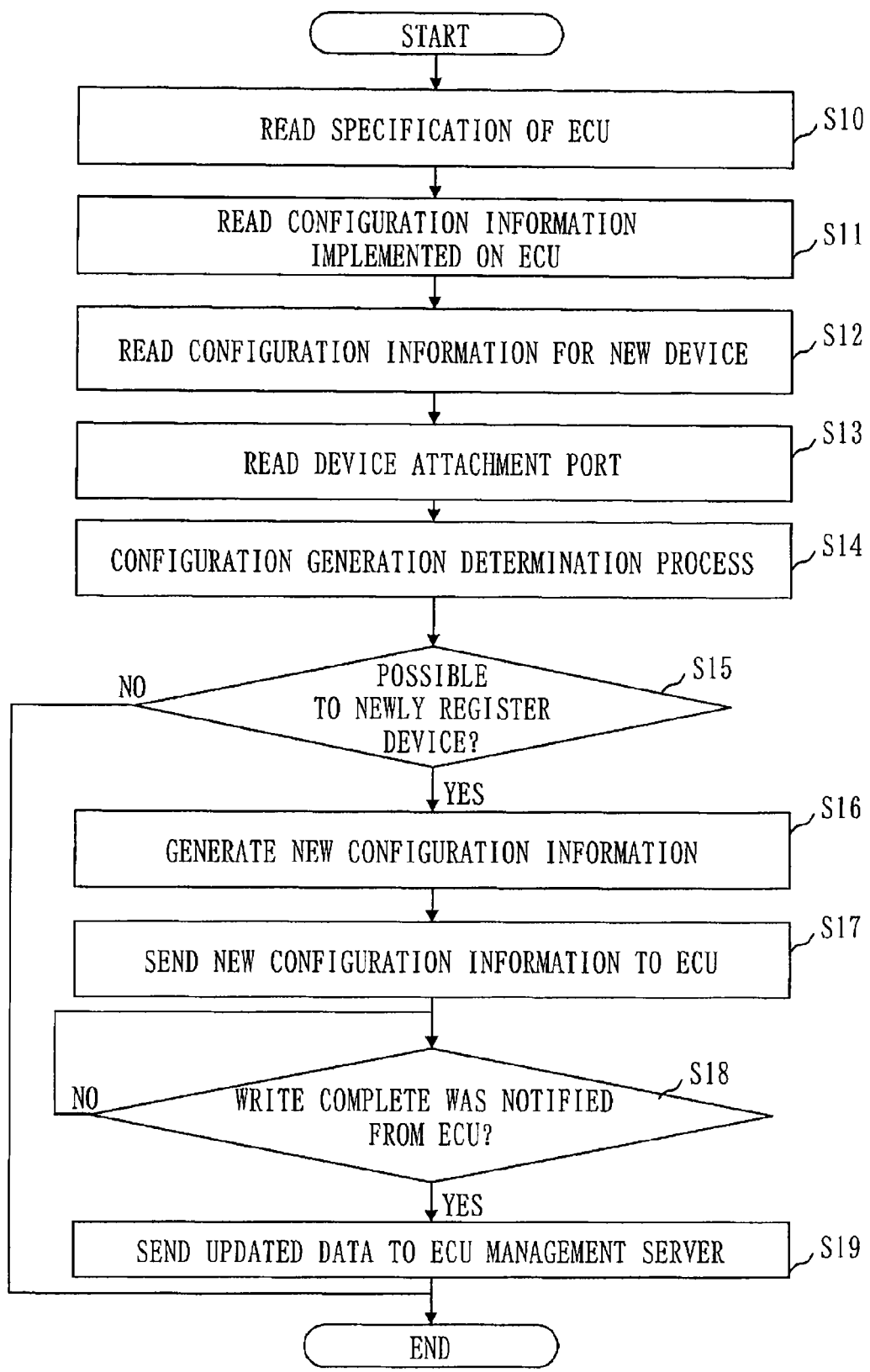
FIG. 5 a flowchart showing an operation of a configuration information generation section according to the first embodiment.

Further, the configuration information generation section 11, upon receiving the notification of write complete from the ECU 2 (S18 of FIG. 5), sends to the ECU management server 10 the new configuration information generated at S16 as updated data via the communication section 16 (S19 of FIG. 5).

Figure 7:
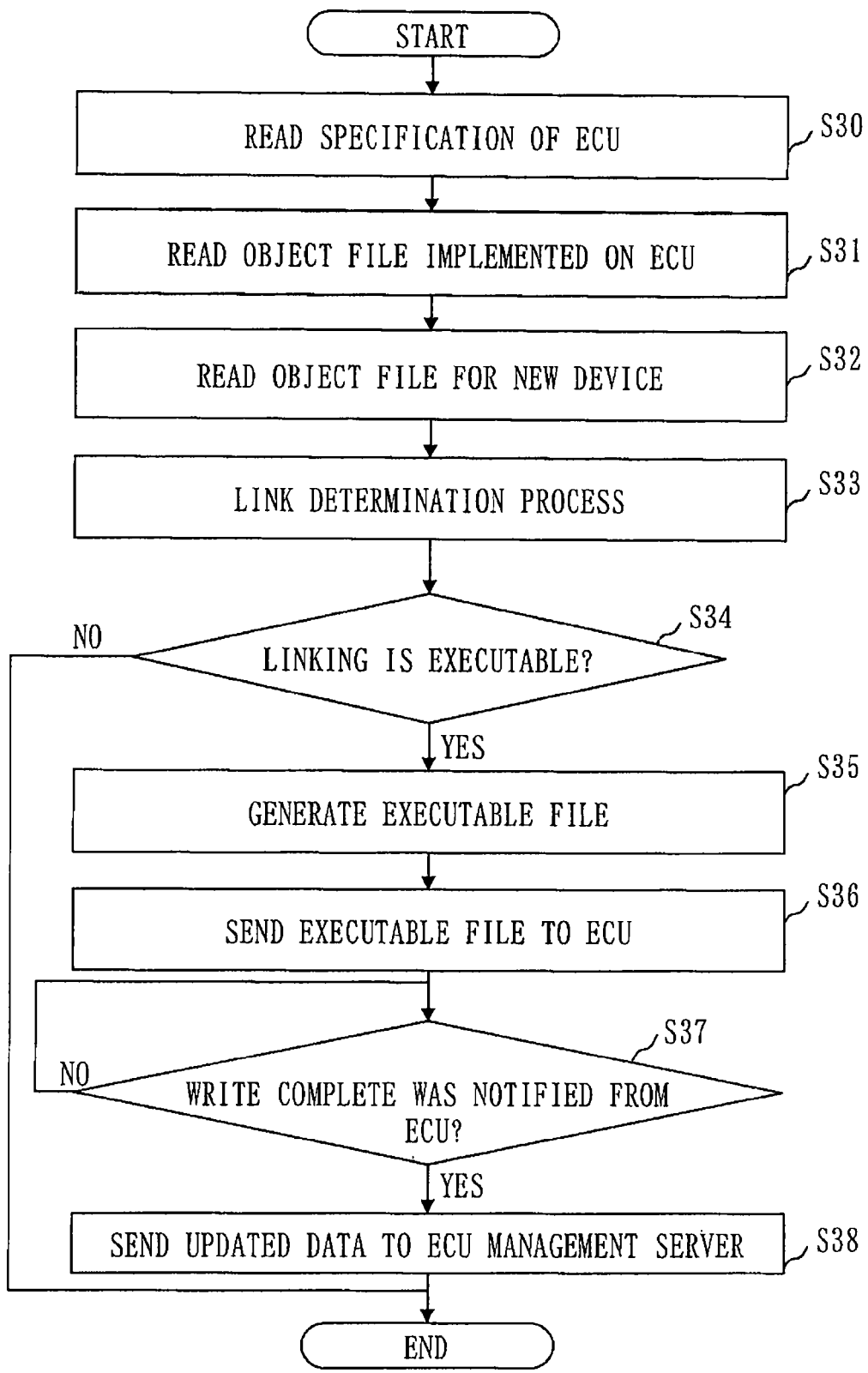
FIG. 7 a flowchart showing an operation of an executable file generation section according to the first embodiment.

The executable file generation section 12, upon receiving the notification of write complete from the ECU 2 (S37 of FIG. 7), sends to the ECU management server 10 generated information at the time of generating the executable file at S35 as updated data via the communication section 16 (S38 of FIG. 7).

The ECU management server 10, upon receiving the updated data sent at S38 (S56 of FIG. 3), updates information of an object file of a corresponding ECU ID based on the updated data received from the executable file generation section 12 (S57).

The ECU management server 10, upon receiving the updated data sent at S19 (S58), updates configuration information of the corresponding ECU ID based on the updated data received from the configuration information generation section 11 (S59).

Figure 14:
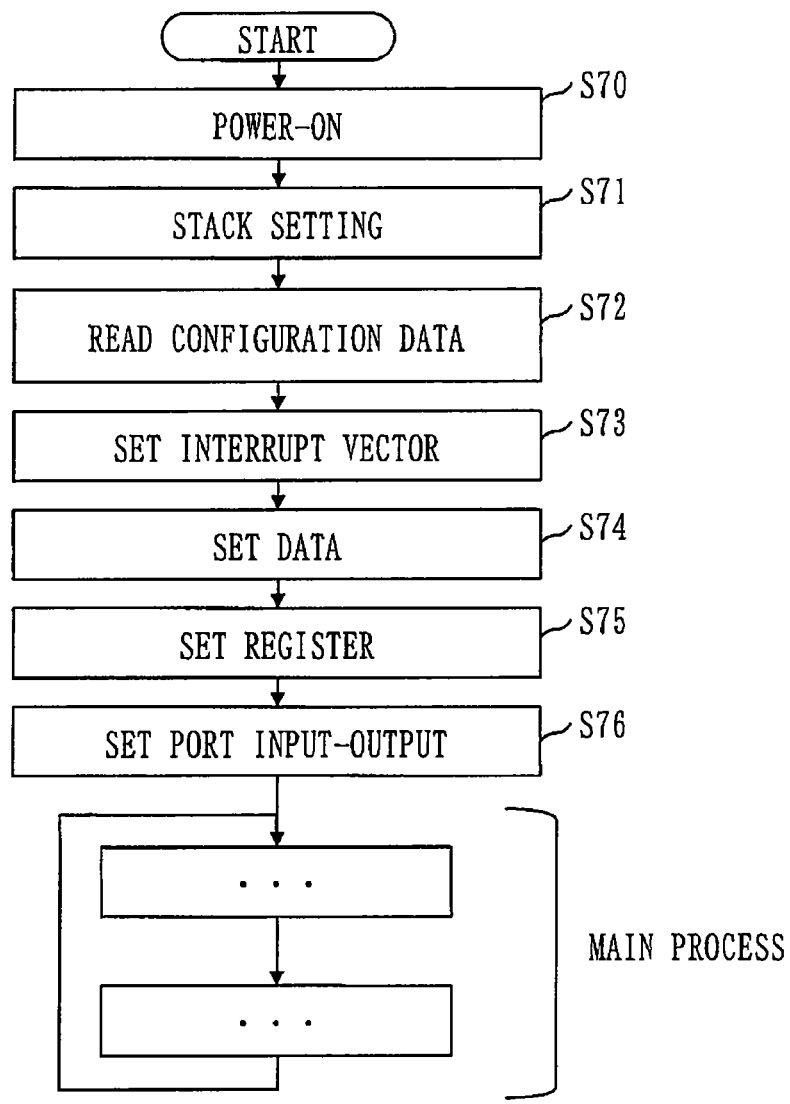
FIG. 14 a flowchart showing a process of the ECU at power-on according to the first embodiment.

A flow showing a process at power-on of the ECU 2 will be explained using FIG. 14.

The ECU 2, after power becomes ON (S70), performs a stack setting to a startup program as usual (S71).

Next, the ECU 2 reads the configuration information from the configuration data area described in FIG. 15 (S72).

The ECU 2, based on the configuration information read at S72, then performs an interrupt vector setting (S73), a data setting (S74), a register setting (S75), and a port input-output setting (S76) carried out in the usual startup program.

As described above, the controller software of the new device 5 is added to the ECU 2 installed on the vehicle 1, and the vehicle 1 becomes capable of using the new device 5.

As described, according to the present embodiment, by generating the configuration information in the external terminal apparatus, the communication function is not necessary on the device to be added, and in the control apparatus (ECU) which is installed on the vehicle, a program is executed using not a dynamic link, but a static link of a software module.

Accordingly, attaching and detaching of a device that requires addition/updates of the controller software in the ECU can be realized with low cost.

By providing the input-output section relating to the device to be added, the communication function to send information is not necessary on the device to be added.

By automatically generating the configuration information in the external terminal apparatus, configuration generation operation by a person is not necessary.

Furthermore, by generating an executable file managed with a physical address from the software module managed with a logical address in the external terminal apparatus, the program is executed using not the dynamic link, but the static link in the ECU which is installed on the vehicle.

As stated above, the external terminal apparatus of the present embodiment including the following was explained:
   an external I/F which is able to communicate with an ECU installed on a vehicle;
   a means to input an ID of a device to be attached to the vehicle and attachment location information of the device, and an output means that performs confirmation of the above;
   a means to obtain a specification of the ECU to which the device is connected, and an object file and configuration information implemented on the ECU from a server that manages information of the ECU installed on the vehicle;
   a means to obtain an object file and configuration information corresponding to the device from a server that manages software corresponding to the device;
   a means to automatically generate new configuration information from the configuration information of a device to be newly attached and existing configuration information of the ECU; and
   an automatic link execution means to generate an executable file that is executable in the ECU from the object file of a device to be newly attached and the object file already implemented on the ECU.

The ECU according to the present embodiment including the following was explained:
   a means to send to the external terminal apparatus, an ID of the ECU and
   a means to arrange and write each of the executable file and the configuration information sent from the external terminal apparatus, to a predetermined area.

Embodiment 2

Figure 16:
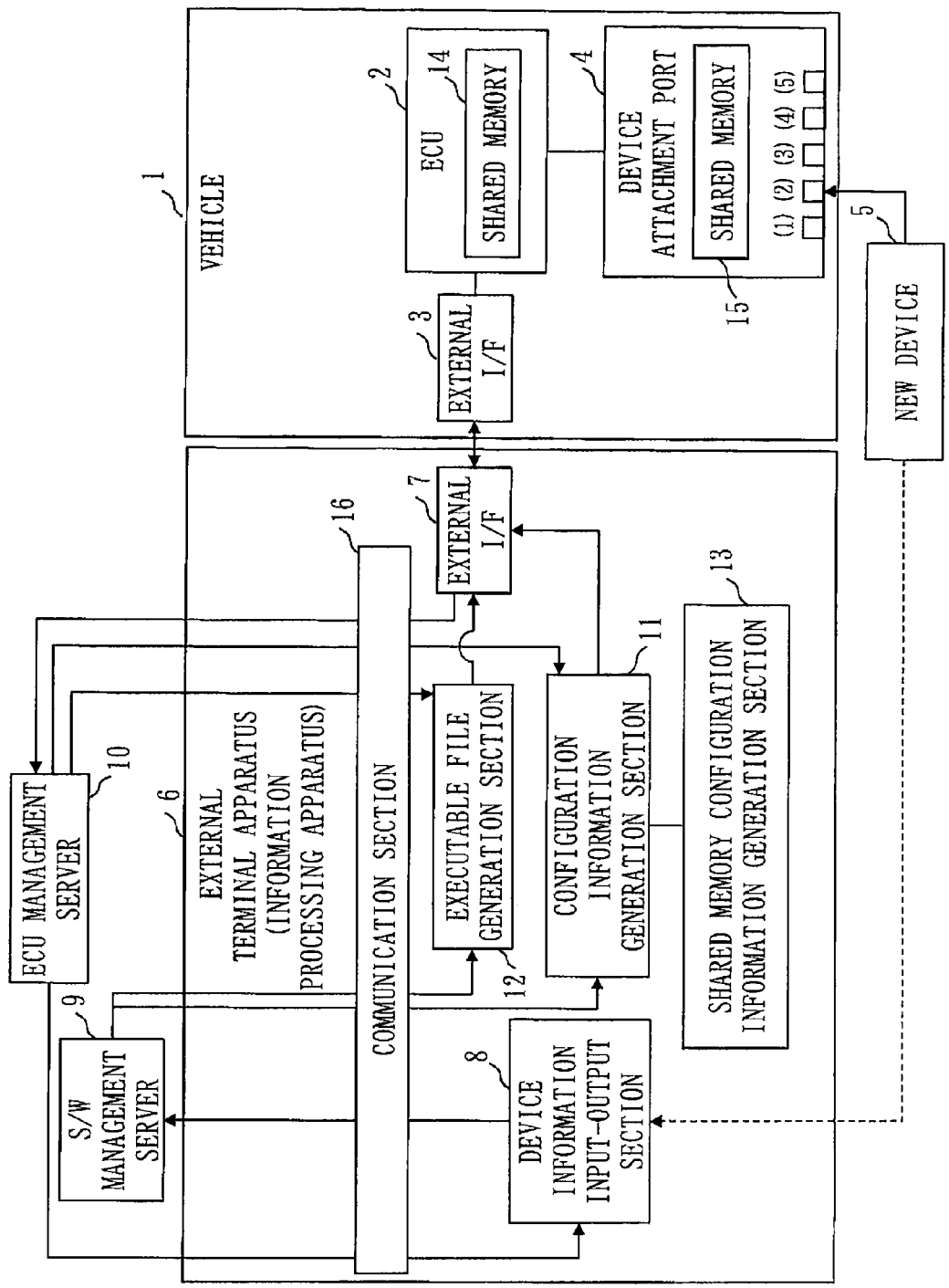
FIG. 16 a diagram showing an example of structures of the on-vehicle apparatus and the external terminal apparatus according to a second embodiment.

FIG. 16 is a diagram showing structures of an on-vehicle apparatus and an external terminal apparatus according to the present embodiment.

In FIG. 16, the device attachment port 4 and the ECU 2 are separate parts.

The ECU 2 and the device attachment port 4 are connected by a network.

Therefore, each terminal of the device attachment port 4 is logically connected to the microcomputer implemented on the ECU 2 or a terminal of another IC.

The ECU 2 is provided with shared memory 14 and the device attachment port is provided with shared memory 15, for sending and receiving data between the ECU 2 and the device attachment port 4.

The shared memory 15 corresponds to an example of a first memory, and the shared memory 14 corresponds to an example of a second memory.

The shared memory 14 of the ECU 2 and the shared memory 15 of the device attachment port 4 transfer data to each other, synchronizing and periodically updating via the network between the ECU 2 and the device attachment port 4, based on a lay out definition of data previously defined to respective memory space.

If the data layout definition of the memory space and timing of periodic communication via the network can be changed, the device attachment port acquires broader usage and versatility.

For example, for improving accuracy of an A/D (Analog/Digital) conversion or a D/A (Digital/Analog) conversion, a large amount of bits of memory needs to be allotted.

On the contrary, in logical data such as Low/High of the terminal, not a large amount of bits is required.

Since there is a limit to the memory space, an appropriate number of bits needs to be allotted for each signal.

A shared memory configuration information generation section 13 of the ECU 2 includes a means to manage a shared memory as described above.

Embodiment 3

The S/W management server 9 and the ECU management server 10 of FIG. 1 may manage source code of the control program in addition to the object file of the control program.

Where the S/W management server 9 and the ECU management server 10 manage the source code of the control program, the executable file generation section 12 includes a compiler in addition to the linker, compiles the source code, and after generating the object file, executes the linker to generate the executable file.

Embodiment 4

In Embodiment 1, corresponding to an update of an application code (an executable file of the controller software) only or to an update of the configuration information only, as shown in FIG. 15, the application code area and the configuration data area are separated with redundancy in the memory space.

Where either of the application code or the configuration information is not required to be updated, a structure in which the area is not separated is applicable.

In this case, as with general embedded equipment, the configuration information is managed in the application code.

In this case, in the power-on process of the ECU 2 (FIG. 14), the process of S72 is not necessary.

Embodiment 5

In Embodiment 1, when the new device 5 is attached, the controller software is added, and when the device is detached, the controller software is deleted.

The present embodiment is realized basically with a similar flow as the flow of adding the device shown in Embodiment 1.

What differs from Embodiment 1 is that the device information input-output section 8 is provided with a means that enables the operator to select a device to be detached from a list of devices.

Specifically, for example, the operator can select the device to be detached by touching the detachable device displayed on the touch panel.

Taking an example of detaching the new device 5 added in Embodiment 1, the configuration information generation section 11 generates the configuration information to be used after the device 5 is detached (FIG. 9) from the information to be read as the configuration information of the current ECU 2 (FIG. 12), and based on the configuration information of the device 5 to be detached (FIG. 10).

The executable file generation section 12 deletes the object file of a control program for controlling the device 5 to be detached, from the object file of the current control program of the ECU 2, and generates the executable file of a new control program that the ECU 2 executes after the device 5 is detached.

Embodiment 6

The device information input-output section 8 may be provided with an input means of the ECU ID so that the condition of the device attachment port 4 may be confirmed in advance without connecting the ECU 2 to the external terminal apparatus 6.

Finally, an example of a hardware structure of the external terminal apparatus 6 shown in Embodiments 1 through 6 will be explained referring to FIG. 17.

The external terminal apparatus 6 is a computer and each element of the external terminal apparatus 6 may execute a process by a program.

The external terminal apparatus 6 may store the program in a storage medium and may enable the program to be read by the computer from the memory medium.

As for the hardware structure of the external terminal apparatus 6, a calculation apparatus 901, an external storage apparatus 902, a main memory apparatus 903, a communication apparatus 904, an input-output apparatus 905, and an external I/F 906 are connected to a bus.

The calculation apparatus 901 is a CPU (Central Processing Unit) that executes the program.

The external storage apparatus 902 is, for example, a ROM (Read Only Memory) or a flash memory.

The main memory apparatus 903 is a RAM (Random Access Memory).

The communication apparatus 904 is a communication card for wireless communication.

The input-output apparatus 905 is, for example, a touch panel display apparatus.

The external I/F 906 is the external I/F 7 shown in FIG. 1.

The program is usually stored in an external storage apparatus 902, and in a condition of being loaded in a main memory apparatus 903, read by the calculation apparatus 901 sequentially, and executed.

The program is the program that realizes a function explained as " . . . section" shown in FIG. 1.

Further, in the external storage apparatus 902, an operating system (OS) is also stored, and at least a part of the OS is loaded in the main memory apparatus 903, and the calculation apparatus 901, while executing the OS, executes the program that realizes the function of " . . . section" shown in FIG. 1.

In the explanation of Embodiments 1 through 6, information, data, signal values, and variable values that show results of processes that are explained as "decision of . . . ", "determination of . . . ", "extraction of . . . ", "comparison of . . . ", "updating of . . . ", "setting of . . . ", "registration of . . . ", "selection of . . . ", "generation of . . . ", "inputting of . . . ", "outputting of . . . ", etc. are stored in the main memory apparatus 903 as a file.

The object file and the configuration information received from the S/W management server 9 and the ECU management server 10 are stored in the external storage apparatus 902 or the main memory apparatus 903.

A decryption key/encryption key, a random value, and a parameter may be stored in the main memory apparatus 903 as a file.

Figure 17:
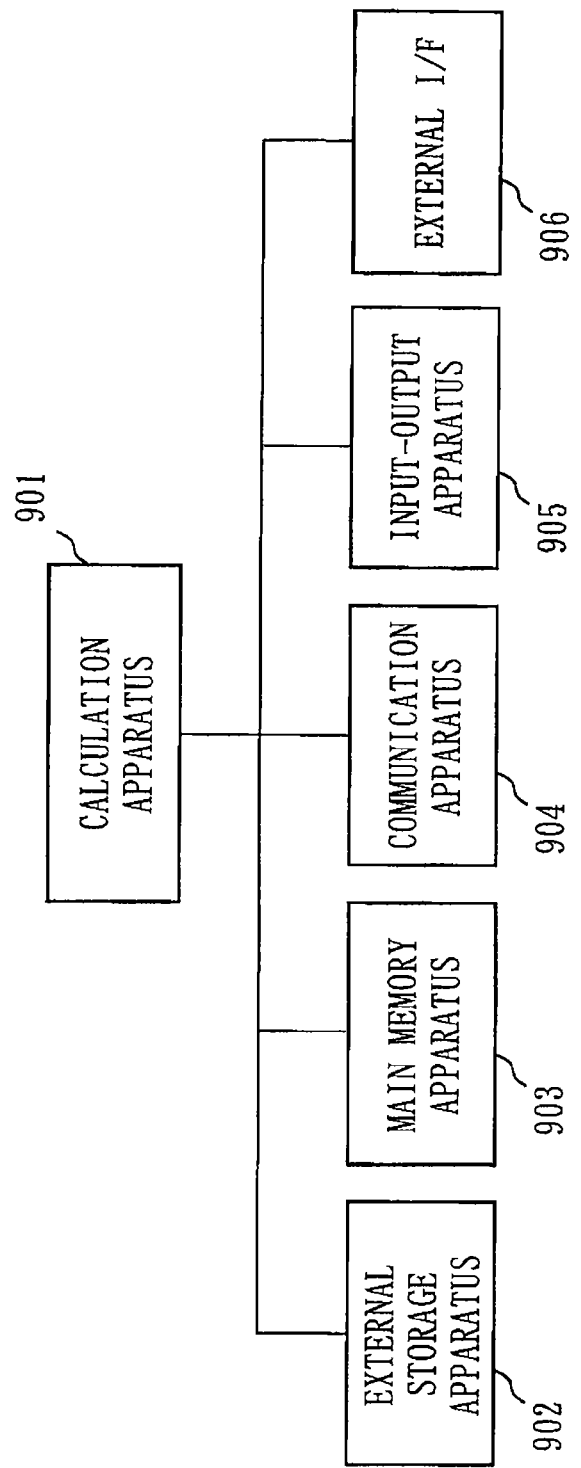
FIG. 17 a diagram showing an example of a hardware structure of the external terminal apparatus according to the first through sixth embodiments.

Furthermore, the structure of FIG. 17 shows only an example of the hardware structure of the external terminal apparatus 6, and the hardware structure of the external terminal apparatus 6 may be in another structure, not limiting to the structure described in FIG. 17.

By a procedure shown in the flowcharts of Embodiments 1 through 6, an information processing method according to the present invention is realizable.

REFERENCE SIGNS LIST

1: vehicle, 2: ECU, 3: external I/F, 4: device attachment port, 5: new device, 6: external terminal apparatus, 7: external I/F, 8: device information input-output section, 9: S/W management server, 10: ECU management server, 11: configuration information generation section, 12: executable file generation section, 13: shared memory configuration information generation section, 14: shared memory, 15: shared memory, 16: communication section

The invention claimed is:

1. An information processing apparatus comprising:
a processor to execute a program; and
a memory to store the program which, when executed by the processor, results in performance of steps comprising,
generating a new configuration information of an electronic control unit installed on a vehicle after connecting a newly connected device to the electronic control unit, using configuration information of the electronic control unit and configuration information of the newly connected device, the electronic control unit being separate from the information processing apparatus;

generating an executable file of a new control program which the electronic control unit is to execute after the newly connected device is connected by linking an object file of a control program implemented on the electronic control unit, and an object file of a control program from the information processing apparatus to control the newly connected device; and uploading the new configuration information and the executable file of the new control program from the information processing apparatus to the electronic control unit.

2. The information processing apparatus according to claim 1, wherein the program stored in the memory which, when executed by the processor further results in performing the step of:

communicating, from a first management apparatus that manages the configuration information of the electronic control unit and the object file of the control program implemented on the electronic control unit, the configuration information of the electronic control unit and the object file of the control program implemented on the electronic control unit, and from a second management apparatus that manages the configuration information of the newly connected device and the object file of the control program to control the newly connected device, the configuration information of the newly connected device and the object file of the control program to control the newly connected device, wherein the generating of the new configuration information generates, using the configuration information of the electronic control unit received by the communicating from the first management apparatus, and the configuration information of the newly connected device received by the communicating from the second management apparatus, the new configuration information, and wherein the generating of the executable file generates, by linking the object file of the control program implemented on the electronic control unit received by the communicating from the first management apparatus, and the object file of the control program that controls the newly connected device received by the communicating from the second management apparatus, the executable file of the new control program.

3. The information processing apparatus according to claim 2, wherein the communicating sends to the first management apparatus, after the new configuration information and the executable file of the new control program are uploaded to the electronic control unit, and the new configuration information and the executable file of the new control program are stored in the electronic control unit, at least either of the new configuration information and the data that enables the first management apparatus to generate the new configuration information from the configuration information managed in the first management apparatus, and at least either of the object file of the new control program and the data that enables the first management apparatus to generate the object file of the new control program from the object file managed in the first management apparatus.

4. The information processing apparatus according to claim 1, wherein the program stored in the memory which, when executed by the processor further results in performing the step of:

communicating, from a first management apparatus that manages the configuration information of the electronic control unit and source code of the control program implemented on the electronic control unit, the configuration information of the electronic control unit and the source code of the control program implemented on the electronic control unit, and from a second management apparatus that manages the configuration information of the newly connected device and source code of the control program to control the newly connected device, the configuration information of the newly connected device and the source code of the control program to control the newly connected device, wherein the generating of the new configuration information generates, using the configuration information of the electronic control unit received from the first management apparatus, and the configuration information of the newly connected device received from the second management apparatus, the new configuration information, and the generating of the executable file generates an object file by compiling the source code of the control program implemented on the electronic control unit received by the communicating from the first management apparatus, generates an object file by compiling the source code of the control program to control the newly connected device received by the communicating from the second management apparatus, and generates the executable file of the new control program by linking the two generated object files.

5. The information processing apparatus according to claim 4, wherein the communicating sends to the first management apparatus, after the new configuration information and the executable file of the new control program are uploaded to the electronic control unit, and the new configuration information and the executable file of the new control program are stored in the electronic control unit, at least either of the new configuration information and the data that enables the first management apparatus to generate the new configuration information from the configuration information managed in the first management apparatus, and at least either of the source code of the new control program and the data that enables the first management apparatus to generate the source code of the new control program from the source code managed in the first management apparatus.

6. The information processing apparatus according to claim 1, wherein the generating of configuration information determines whether or not allotting a resource in the electronic control unit to the newly connected device is possible, and if allotting the resource in the electronic control unit to the newly connected device is possible, generates the new configuration information.

7. The information processing apparatus according to claim 1, wherein the generating of the executable file determines whether or not the executable file of the new control program is capable of being accommodated in a predetermined storage area in the electronic control unit, and if the executable file of the new control program is capable of being accommodated in the storage area, generates the executable file of the new control program.

8. The information processing apparatus according to claim 1, wherein the electronic control unit, being connected by a device attachment port including a first memory via a network, includes a second memory that sends and receives data of a device to be attached to the device attachment port between the first memory via the network, and the generating of the configuration information generates the new configuration information including information to manage the first memory and the second memory.

9. The information processing apparatus according to claim 1, wherein the generating of the configuration information generates, using the configuration information of the electronic control unit and configuration information of a detach-device to be detached from the electronic control unit, new configuration information of the electronic control unit after the detach-device is detached, and the generating of the executable file deletes an object file of a control program that controls the detach-device from the object file of the control program implemented on the electronic control unit, and generates the executable file of a new control program that the electronic control unit executes after the detach-device is detached.

10. The information processing apparatus according to claim 1, wherein the information processing apparatus receives the configuration information of the electronic control unit from the electronic control unit.

11. A non-transitory computer readable medium including a program that includes computer executable instructions which cause computer execute:

a configuration information generation process to be executed on an information processing apparatus that generates, a new configuration information of an electronic control unit installed on a vehicle after connecting a newly connected device to the electronic control unit, using configuration information of the electronic control unit and configuration information of the newly connected device the electronic control unit being separate from the information processing apparatus;

an executable file generation process that generates an executable file of a new control program which the electronic control unit executes after the newly connected device is connected by linking an object file of a control program implemented on the electronic control unit, and an object file of a control program from the information processing apparatus to control the newly connected device; and an upload process that uploads the new configuration information and the executable file of the new control program from the information processing apparatus to the electronic control unit.

12. An information processing method, comprising:

generating a new configuration information of an electronic control unit installed on a vehicle after connecting a newly connected device to the electronic control unit, using configuration information of the electronic control unit and configuration information of the newly connected device, the electronic control unit being separate from an information processing apparatus;

generating an executable file of a new control program which the electronic control unit is to execute after the newly connected device is connected by linking an object file of a control program implemented on the electronic control unit, and an object file of a control program from the information processing apparatus to control the newly connected device; and uploading the new configuration information and the executable file of the new control program from the information processing apparatus to the electronic control unit.

* * * * *